US012221924B2

United States Patent
Grech et al.

(10) Patent No.: US 12,221,924 B2
(45) Date of Patent: Feb. 11, 2025

(54) COMBINED GAS TURBINE ENGINE AND FUEL CELL

(71) Applicant: ROLLS-ROYCE PLC, London (GB)

(72) Inventors: Nicholas Grech, Derby (GB); Chloe J Palmer, Derby (GB); Jacopo Tacconi, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/379,728

(22) Filed: Oct. 13, 2023

(65) Prior Publication Data

US 2024/0133340 A1 Apr. 25, 2024
US 2024/0229711 A9 Jul. 11, 2024

(51) Int. Cl.
*F02C 6/04* (2006.01)
*F02C 7/224* (2006.01)
*F02C 9/40* (2006.01)
*H01M 8/04111* (2016.01)

(52) U.S. Cl.
CPC .............. *F02C 6/04* (2013.01); *F02C 7/224* (2013.01); *F02C 9/40* (2013.01); *H01M 8/04111* (2013.01); *F05D 2220/323* (2013.01); *F05D 2220/50* (2013.01); *H01M 2250/20* (2013.01); *H01M 2250/407* (2013.01)

(58) Field of Classification Search
CPC .............. F02C 7/224; H01M 8/04111; H01M 2250/407
See application file for complete search history.

(56) References Cited

U.S. PATENT DOCUMENTS

| 4,942,733 A | 7/1990 | Hosford |
| 5,482,791 A * | 1/1996 | Shingai ............... H01M 8/0612 |
| | | 429/429 |
| 2013/0276433 A1 | 10/2013 | Yamasaki et al. |
| 2020/0088102 A1 | 3/2020 | Roberge |

(Continued)

FOREIGN PATENT DOCUMENTS

| CA | 2247197 A1 | 8/1997 |
| EP | 3845747 A1 | 7/2021 |

(Continued)

OTHER PUBLICATIONS

Apr. 24, 2023 Search Report issued in British Patent Application No. 2215722.6.

(Continued)

*Primary Examiner* — Scott J Walthour
(74) *Attorney, Agent, or Firm* — Oliff PLC

(57) ABSTRACT

A combined gas turbine engine and hydrogen fuel cell system includes a hydrogen fuelled gas turbine engine, a cryogenic liquid hydrogen fuel tank, a first fuel offtake configured and arranged to divert a portion of hydrogen fuel from a main fuel conduit, a burner configured and arranged to burn the portion of hydrogen fuel diverted from the main fuel conduit, a heat exchanger configured and arranged to transfer heat from exhaust gasses produced by the burner to hydrogen fuel in the main fuel conduit, a second fuel offtake arranged to divert a portion of hydrogen fuel from the main fuel conduit downstream of the heat exchanger, and a hydrogen fuel cell configured and arranged to produce electric power using hydrogen fuel diverted from the second fuel offtake.

9 Claims, 3 Drawing Sheets

(56) References Cited

U.S. PATENT DOCUMENTS

2021/0245629 A1*   8/2021   Klimpel .............. H01M 8/0432
2022/0099020 A1     3/2022   Palmer
2022/0297844 A1     9/2022   Mackin et al.
2023/0053230 A1     2/2023   Jo et al.
2023/0358166 A1*   11/2023   Veilleux, Jr. .............. F02C 3/10

FOREIGN PATENT DOCUMENTS

EP     3978807 A2   4/2022
EP     3995679 A1   5/2022
EP     4144970 A2   3/2023
GB     2295858 A     6/1996
WO    97/31184 A1   8/1997

OTHER PUBLICATIONS

Apr. 19, 2023 Search Report issued in British Patent Application No. 2215721.8.
U.S. Appl. No. 18/379,717, filed Oct. 13, 2023 in the name of Chloe J Palmer et al.
Feb. 26, 2024 Extended Search Report issued in European Patent Application No. 23199576.2.
Feb. 26, 2024 Extended Search Report issued in European Patent Application No. 231995770.0.

* cited by examiner

COMBINED GAS TURBINE ENGINE AND FUEL CELL

TECHNICAL FIELD

This disclosure relates to a combined gas turbine engine and fuel cell.

BACKGROUND

In order to limit emissions of carbon dioxide, use of hydrogen as an alternative to hydrocarbon fuel in gas turbine engines has historically only been practical in land-based installations. However, liquid hydrogen fuelled airliners have recently been proposed. The liquid for fuel such aircraft however must be heated prior to combustion. Doing so in a manner which is efficient from an overall propulsion system perspective is a significant challenge.

SUMMARY

The invention is directed towards a combined gas turbine engine and hydrogen fuel cell system.

In an aspect, one such combined gas turbine engine and hydrogen fuel cell system comprises:
 a hydrogen fuelled gas turbine engine;
 a cryogenic liquid hydrogen fuel tank;
 a first fuel offtake configured and arranged to divert a portion of hydrogen fuel from a main fuel conduit;
 a burner configured and arranged to burn the portion of hydrogen fuel diverted from the main fuel conduit;
 a heat exchanger configured and arranged to transfer heat from exhaust gasses produced by the burner to hydrogen fuel in the main fuel conduit;
 a second fuel offtake arranged to divert a portion of hydrogen fuel from the main fuel conduit downstream of the heat exchanger; and
 a hydrogen fuel cell configured and arranged to produce electric power using hydrogen fuel diverted from the second fuel offtake.

Advantageously, a system that provides both propulsive and electrical power is provided, in which a common source of temperature controlled hydrogen is provided for both systems. The provision of a hydrogen fuel cell utilising hydrogen from the same source enables the reduction or elimination of gas turbine driven electrical generators, which both improves gas turbine engine specific fuel consumption, and reduces operation restrictions (such as minimum operating rotational speeds) of the gas turbine, thereby permitting further optimisations.

In an embodiment, the hydrogen fuel cell comprises a cooling system comprising a closed cooling loop.

In an embodiment, the closed cooling loop comprises a first fuel cell heat exchanger configured to transmit waste heat from the hydrogen fuel cell to a coolant of the closed cooling loop.

In an embodiment, the closed cooling loop comprises a second fuel cell heat exchanger arranged to transmit waste heat from the coolant of the closed cooling loop to hydrogen fuel. Advantageously, waste heat from the fuel cell is utilised within the combined engine and fuel cell fuel cycle, thereby increasing overall efficiency.

In an embodiment, the second fuel cell heat exchanger is provided upstream of the fuel cell and downstream of the second fuel offtake in fuel cell fuel flow. Advantageously, waste heat from the fuel cell cycle is maintained within the fuel cell thermodynamic cycle, thereby increasing overall thermal efficiency.

In an embodiment, a third fuel offtake is provided downstream of the second fuel cell heat exchanger in fuel cell fuel flow, and is configured to offtake a portion of the hydrogen fuel diverted from the second fuel offtake to fuel the hydrogen fuel cell, and divert the remaining portion of the hydrogen fuel to a bypass line.

In an embodiment, a third fuel cell heat exchanger is provided in the bypass line downstream of the third fuel offtake, and is configured to exchange heat between hydrogen fuel in the bypass line and a fuel cell air intake line. Advantageously, air input to the fuel cell is cooled, while the hydrogen fuel is further heated.

In an embodiment, the bypass line comprises an outflow which exhausts into the main fuel conduit downstream of the second fuel offtake in gas turbine engine fuel flow. Advantageously, waste heat from the fuel cell is returned to the main fuel conduit via the heat exchangers and bypass line, such that waste heat is returned to the thermodynamic cycle of the gas turbine engine. As such, the overall thermodynamic efficiency of the combined gas turbine engine and hydrogen fuel cell is increased.

In an embodiment, the system comprises a burner exhaust turbine arranged to be driven by exhaust from the burner. Advantageously, the waste heat and pressure in the burner exhaust flow can be used to power additional equipment via the exhaust turbine.

In an embodiment, the burner exhaust turbine is configured to drive a fuel cell air compressor configured to provide air to the hydrogen fuel cell. Advantageously, compressed air for the hydrogen fuel cell is provided from power generated from waste heat from the burner. As such, overall system thermodynamic efficiency is improved.

In an embodiment, the gas turbine engine comprises a bleed air system configured to bleed compressed air from a gas turbine engine core compressor and supply it to the burner to burn with the portion of hydrogen fuel diverted from the main fuel conduit.

In an embodiment, the bleed air system is configured to supply air to the hydrogen fuel cell. As such, the fuel cell air compressor can optionally be omitted.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
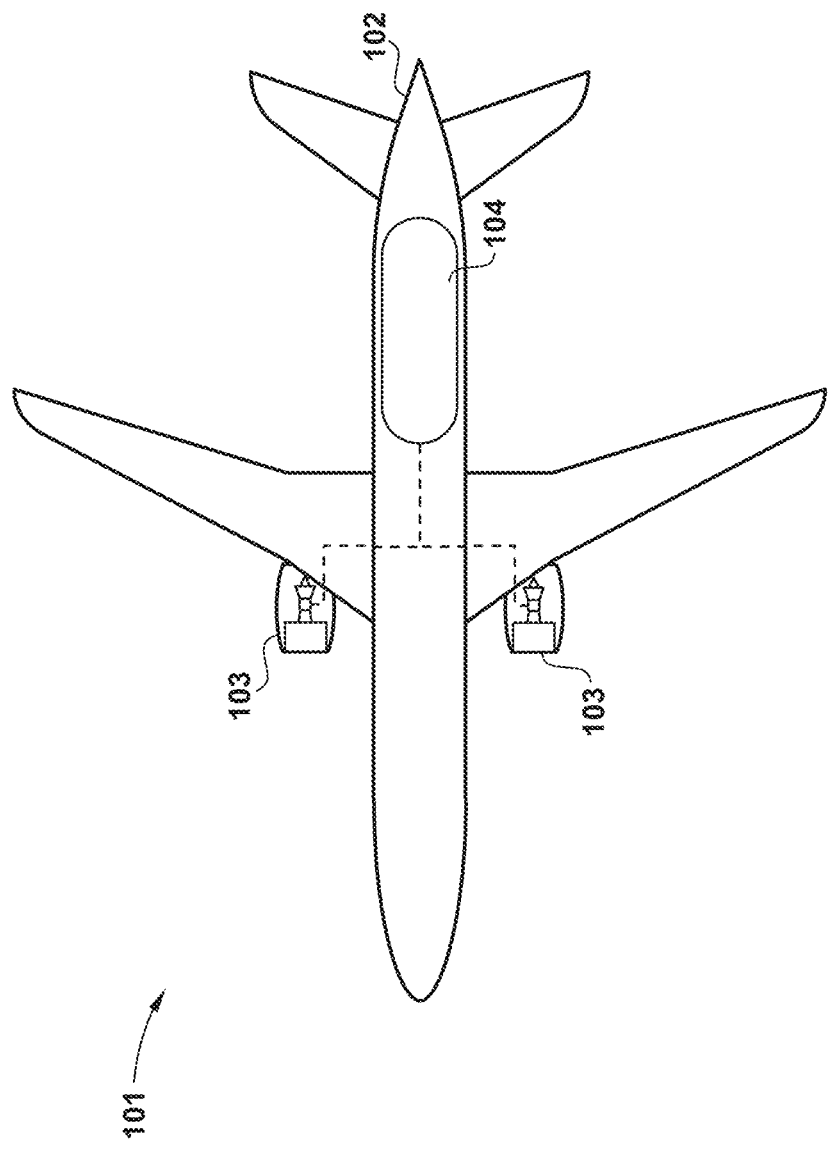
FIG. 1 shows a hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103. In the present embodiment, the turbofan engines 103 are geared turbofan engines comprising a combined gas turbine and hydrogen fuel cell system.

A hydrogen storage tank 104 is located in the fuselage 102. In the present embodiment, the hydrogen storage tank 104 is a cryogenic hydrogen storage tank and thus stores the hydrogen fuel in a liquid state.

Figure 2:
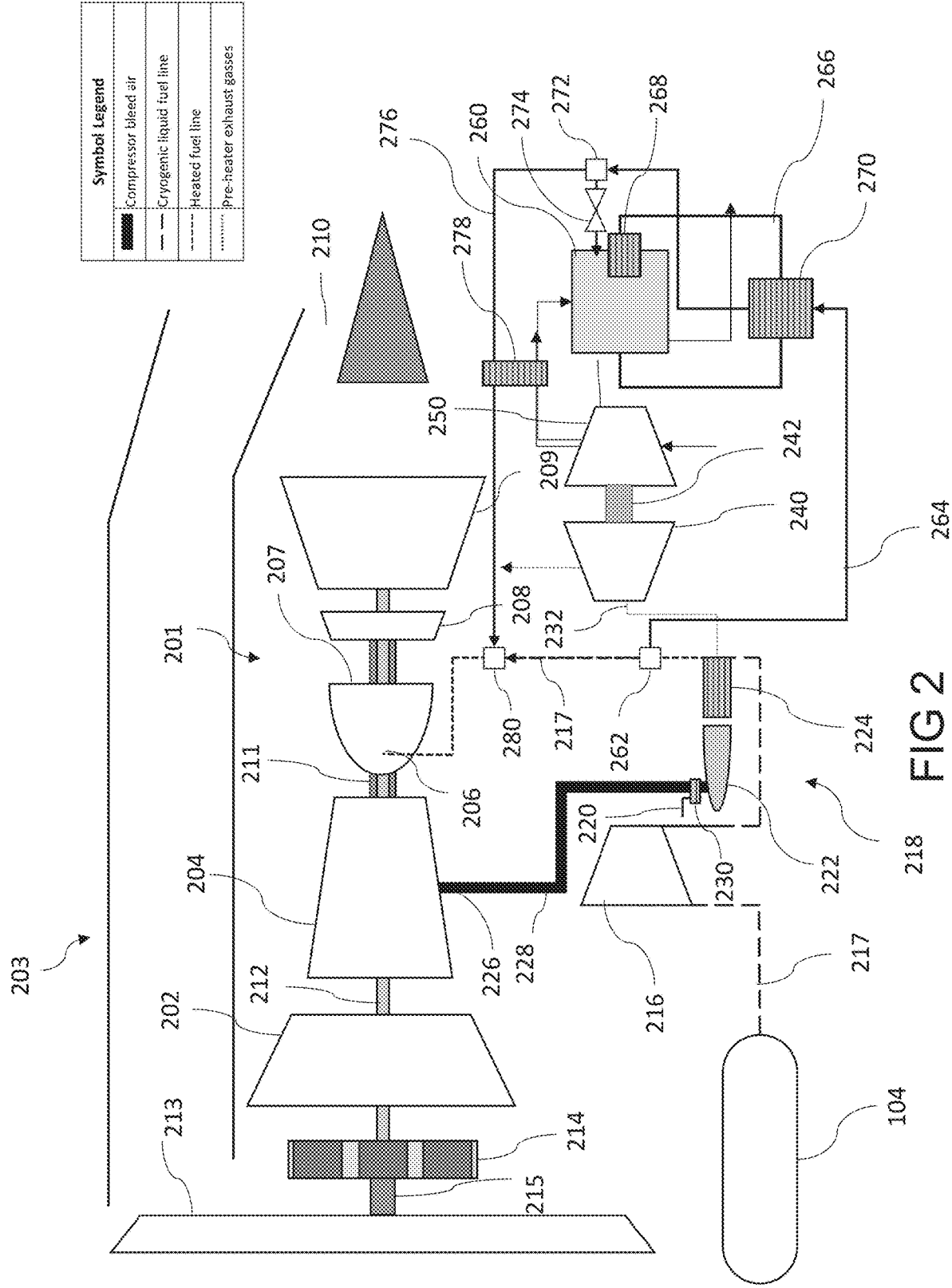
FIG. 2 is a block diagram of one of the engines of FIG. 1 comprising a combined hydrogen fuelled gas turbine engine and hydrogen fuel cell system.

A block diagram of one of the combined gas turbine engine and hydrogen fuel cell system turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

As described previously, in the present embodiment, the turbofan engines 103 are geared turbofan engines. Thus, in operation the low-pressure turbine 209 drives a fan 213 via a reduction gearbox 214. The reduction gearbox receives input drive from the second shaft 212 and provides output drive to the fan 213 via a fan shaft 215. In an embodiment, the reduction gearbox 214 is an epicyclic reduction gearbox. In a specific embodiment, it is a planetary reduction gearbox. Alternatively, it may be a star reduction gearbox, or a compound epicyclic reduction gearbox. As a further alternative, the reduction gearbox 214 could be a layshaft-type reduction gearbox or any other type of reduction gearbox. It will also be appreciated that the principles disclosed herein may be applied to a direct-drive type turbofan engine, i.e. in which there is no reduction gearbox between the low-pressure turbine and the fan.

In operation, hydrogen fuel is pumped from the hydrogen storage tank 104 by a pump 216 and into a main fuel conduit 217 which ultimately delivers fuel to the fuel injection system 206. In the present embodiment, the pump 216 is high-speed centrifugal pump. In a specific embodiment, the centrifugal pump comprises an axial inducer to minimise the required inlet pressure and to accommodate multiphase flow in addition to the centrifugal impeller for developing the majority of the required pressure rise. In an alternative embodiment, a piston-type pump could be used.

In an embodiment, the pump 216 is located inside the hydrogen storage tank 104. In this way leakage of hydrogen fuel past pump seals etc. is accommodated.

In an embodiment, the pump 216 is driven by an electrical machine. In an embodiment, the drive means for the pump 216 are also located in the hydrogen storage tank 104.

As will be appreciated, it is desirable to increase the temperature of the fuel from the cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 kelvin.

In the present embodiment, a pre-heater 218 is therefore provided for heating of the hydrogen fuel. In some cases, this may provide a phase change from a liquid to either a supercritical fluid or a gas. In the present embodiment, this takes place between the pump 216 and the fuel injection system 206. The pre-heater 218 is configured to raise the temperature of the hydrogen fuel to an intermediate temperature less than the injection temperature. This could for example be from 60 to 200 kelvin, for example 150 kelvin. Further heating is subsequently achieved by additional heating means as will be described further.

In a simple cycle configuration, it has been determined that due to the significant heat capacity of the hydrogen fuel, even if it is utilised as a heatsink for engine waste heat, it will still not reach the required injection temperature without implementation of the pre-heater 218. Further, even in a complex cycle configuration in which the heat of combustion products is recuperated into the hydrogen fuel, it has been determined that at certain points in the operational envelope there will be insufficient heat output from the engine to raise the fuel temperature to the injection temperature. Such occasions may include, for example, ground start, in-flight relight, end of cruise idle, etc.

The pre-heater 218 comprises a first hydrogen fuel offtake 220 to divert a portion of the hydrogen fuel from the main fuel conduit 217. The amount of hydrogen bled from the main fuel conduit 217 is controlled by a valve (not shown). In an embodiment, the valve is controlled actively, for example in response to the temperature of the fuel at the fuel injection system 206. Alternatively, the valve may be passively controlled. In operation, of the order of around 1 percent of the hydrogen fuel flow through the main fuel conduit 217 is bled for use in the pre-heater 218.

As described previously, hydrogen has very high specific and latent heat capacities; however as a gas or supercritical fluid it has a very low molecular weight and may have a low density, and thus it can be challenging to exchange heat in a compact way. However, these properties may also be beneficial, as described later herein. Thus the pre-heater 218 heats the hydrogen fuel in the main fuel conduit 217 by combustion of the bled fuel in a burner 222 located in heat exchange relationship with the main fuel conduit 217.

In some embodiments, the burner 222 is concentric around the main fuel conduit 217 and hence the burner 222 itself comprises the heat exchanger for transferring heat to hydrogen fuel in the main fuel conduit 217. It will of course be appreciated that other arrangements are possible. For example, the burner 222 could be positioned separately from the main fuel conduit 217 and exhaust gases therefrom directed through a dedicated heat exchanger unit 224. Such a unit may comprise a first pass for the flow of hot exhaust products from the burner 222, and a second pass for the main fuel flow which then heats as it flows through the heat exchanger unit.

In the present embodiment, air for combustion with the bled hydrogen fuel is bled from the high-pressure compressor 204 from a compressor bleed 226 via a bleed air line 228. Alternatively, it may be bled from the low-pressure compressor 202. It will be appreciated that the air for combustion could be obtained from any other suitable location.

In the present example, the air and the bled hydrogen fuel are mixed in a pre-mixer prior to supply to the burner 222, although in alternative embodiments it may be directly co-injected into the burner with the hydrogen fuel instead.

It should be understood that, in the present example, the products of combustion from the burner 222 are not mixed with the fuel in the main fuel conduit 217. In this respect, the pre-heater 218 therefore differs from a pre-burner system as used in staged combustion cycle rocket engines.

In steady state, there is enough heat emanating from the burner 222 to ensure heating of the small amount of bled hydrogen fuel to a supercritical state. At engine start or other cold conditions for example, the pre-heater 218 comprises a pre-heater 230 to ensure that the bled hydrogen fuel boils prior to mixing with air in the pre-mixer. In a specific embodiment, the pre-heater 230 comprises an electric heating element, for example an inductive coil. Alternatively, the pre-heater 230 could be simply configured as a boil volume, in which the ambient conditions therein contain sufficient enthalpy to boil the initial flow of bled hydrogen fuel prior to delivery to the pre-mixer and the burner 222.

As described previously, it is envisaged that the fuel delivery system 201 and fuel injection system 206 may be used in an embodiment of the core gas turbine 201 implementing a simple cycle as described with reference to FIG. 2, possibly with fuel cooling of engine or gearbox oil or cooling air. Alternatively, the core gas turbine engine 201 may implement a complex cycle.

Combustion products from the burner 222 are exhausted into an exhaust line 232 provided downstream of the heat exchanger 224. The temperature through the exhaust is relatively low, in view of the heat transfer to the hydrogen fuel via the heat exchanger 224. Similarly, mass flow through the exhaust is relatively low, in view of the relatively small amount of fuel used by the burner. However, the available pressure is relatively high.

As such, energy from the exhaust flow can be recovered by a turbine 240 configured to extract power from exhaust gasses of the burner downstream of the heat-exchanger.

The turbine 240 is of conventional construction, and is configured to receive a hot, high pressure exhaust fluid input from the exhaust line 232, and exhaust spent, low pressure fluid into the core nozzle or bypass stream.

The turbine 240 is coupled to a load in the form of a hydrogen fuel cell air compressor 250 via a turbine shaft 242, which is described in further detail below.

A surprisingly high power output is available from the turbine 240. As such, aircraft shaft power extraction for can be significantly reduced. In some cases, a mechanical coupling may be provided for re-introducing shaft power into the gas turbine engine.

As noted above, the combined gas turbine and fuel cell system comprises a fuel cell, which is indicated generally at 260. Hydrogen fuel cells are well known, and comprise an electrochemical cell that converts the chemical energy of a fuel (often hydrogen) and an oxidizing agent (often oxygen) into electricity through a pair of redox reactions. In this disclosure, the fuel comprises hydrogen, and oxygen for the reaction is provided from air. As will be understood, such systems generate waste heat, which needs to be removed from the fuel cell to ensure efficient operation, and which represents inefficiency. The present disclosure reintroduces this waste heat to the combined cycle, to thereby increase overall system efficiency.

The combined gas turbine hydrogen fuel cell system comprises a second fuel offtake 262 configured to divert a portion of fuel from the main fuel conduit 217 to the hydrogen fuel cell 260 via a hydrogen fuel cell fuel conduit 264. The second fuel offtake 262 is provided downstream of the heat exchanger 224 and upstream of the fuel injector 206 in main gas turbine engine hydrogen fuel flow.

The hydrogen fuel cell 262 is cooled using a closed-loop cooling loop 266. The cooling loop 266 is configured to remove waste heat from the hydrogen fuel cell 260 via a first hydrogen fuel cell heat exchanger 268, and transfer the heat to a cooling fluid of the cooling loop 266.

A second hydrogen fuel cell heat exchanger 270 is provided, which is in thermal communication with the coolant of the cooling loop 266 and the hydrogen fuel of the hydrogen fuel cell fuel conduit 264. The second heat exchanger 270 is provided between the second fuel offtake 262 and a hydrogen fuel cell inlet in hydrogen fuel cell flow. Consequently, heat from the fuel cell is transferred to the hydrogen fuel in the conduit 264, before being reintroduced to the hydrogen fuel cell from the hydrogen fuel.

Consequently, the temperature of the hydrogen fuel is maintained at a required temperature for efficient operation. In some cases, hydrogen fuel cells may require a relatively high fuel input temperature, which may be above the temperature of the hydrogen fuel downstream of the pre-heater heat exchanger 224. As such, waste heat from the fuel cell is used to pre-heat hydrogen fuel for the fuel cell, thereby allowing operation using the same low temperature hydrogen fuel as that used by the gas turbine engine 203.

In some cases, an auxiliary air heat exchanger 283 may also be provided, in cooling fluid flow between the first and second heat exchangers 268, 270, downstream of the first heat exchanger 268. If the cooling capacity of the hydrogen fuel in the line 264 is insufficient to provide adequate cooling for the hydrogen fuel cell 260, additional air flow over the auxiliary air heat exchanger from ambient air may be provided to ensure proper temperature control. In general however, the hydrogen fuel cell is sized such that adequate cooling is provided by the hydrogen fuel in most operational conditions.

A third fuel offtake 272 is provided downstream of the second heat exchanger 270 in fuel cell hydrogen fuel flow. The third fuel offtake is configured to offtake a portion of the heated fuel flow from the hydrogen fuel conduit 264, and direct this to the hydrogen fuel cell 260 for reaction with oxygen to generate electricity. A pressure regulator 274 may be provided to reduce the pressure of fuel delivered to the hydrogen fuel cell, which typically requires a lower fuel inlet pressure than the gas turbine engine 203. The remainder of the hydrogen fuel in the hydrogen fuel conduit 264 is directed to a bypass line 276.

The air from the hydrogen fuel cell air compressor 250 is directed to the fuel cell 260 to be reacted with hydrogen fuel to generate electricity via a fuel cell air intake line 281. However, this high-pressure air may be at a relatively high temperature, and may need cooling prior to being introduced to the hydrogen fuel cell. Furthermore, by cooling the inlet air, the air density can be increased, which may allow for a higher density fuel cell. As such, a third hydrogen fuel cell heat exchanger 278 is provided downstream of the compressor 250 and upstream of the fuel cell 260 in compressor air flow. The third heat exchanger is configured to exchange heat with hydrogen fuel in the bypass line 276, thereby cooling the compressor air and further warming the hydrogen fuel in the bypass line 276. As such, the third hydrogen fuel cell heat exchanger 278 is provided downstream of the third fuel offtake 272 in fuel cell hydrogen fuel flow.

The bypass line 276 comprises a fluid connection 280, which fluidly connects the bypass line 276 and main fuel conduit 217 downstream of the third hydrogen fuel heat exchanger 278 in fuel cell fuel flow, and downstream of the second fuel offtake 262 but upstream of the fuel injector 206 in main gas turbine engine fuel flow. As such, the heated hydrogen fuel is combined back into the main gas turbine engine fuel flow prior to introduction to the gas turbine engine injector 206, thereby warming the flow.

Hydrogen fuel downstream of the fluid connection 280 is arranged to be at a temperature and pressure sufficient to meet the requirement of the fuel injector 206 for combustion in the gas turbine engine 206. Consequently, fuel is heated to an adequate extent to ensure efficient gas turbine engine combustion using waste heat from a hydrogen fuel cell cycle. Meanwhile, electrical output from the hydrogen fuel cell is provided at high efficiency, since waste heat is reintroduced to the overall system cycle. Consequently, electrical requirements are met in a highly efficient manner.

It will be understood that air for the hydrogen fuel cell 260 can be provided by other means.

Figure 3:
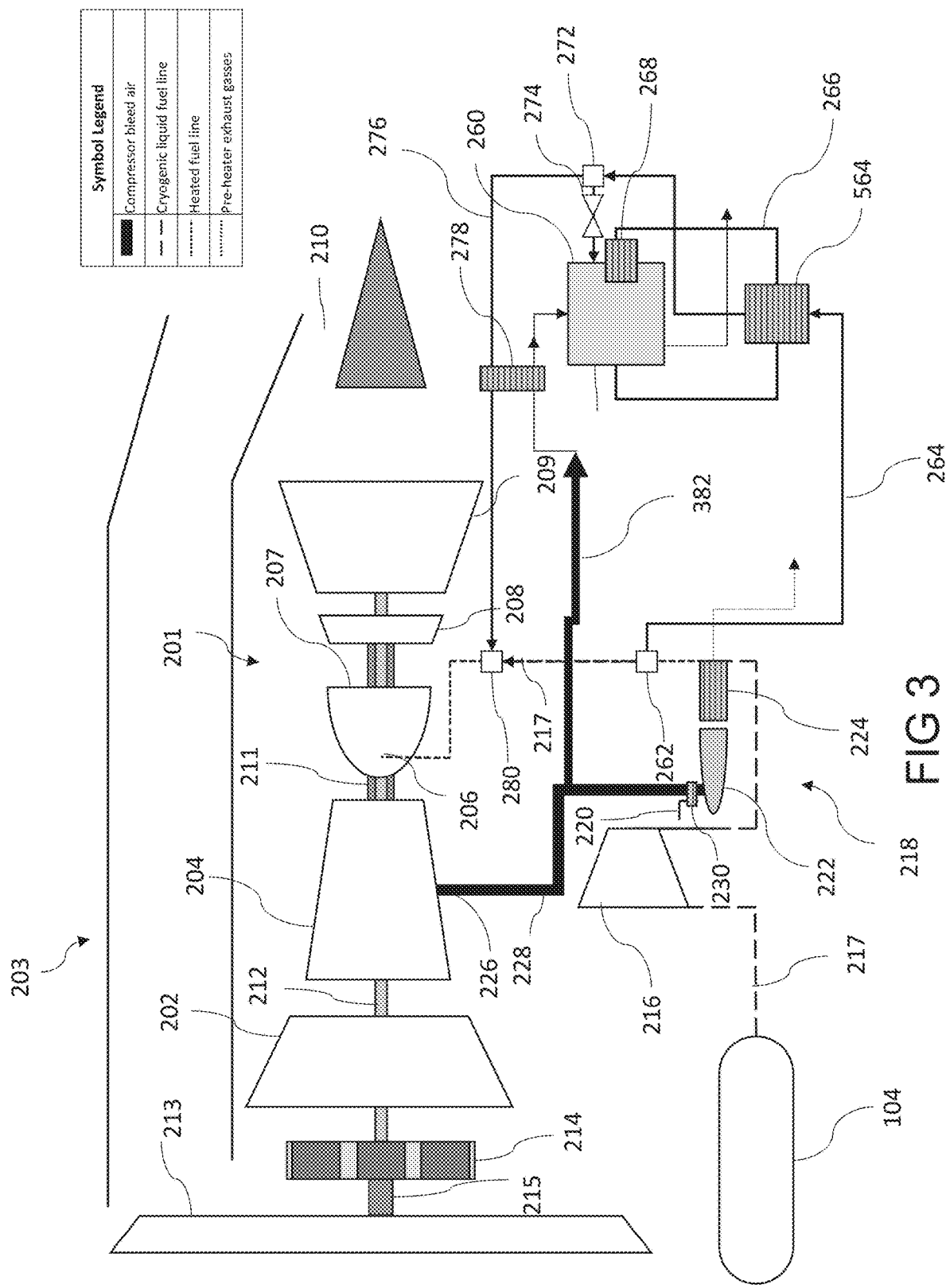
FIG. 3 is a block diagram of one of the engines of FIG. 1 having an alternative combined hydrogen fuelled gas turbine engine and hydrogen fuel cell system.

For example, FIG. 3 illustrates an alternative arrangement, in which the turbine 240, shaft 242, and air compressor 250 are omitted.

In place of these items, a main compressor bleed offtake 382 is provided, which diverts air from the main engine compressor 204 bleed offtake line 226. The remainder of the gas turbine engine 203 and fuel cell 562 is the same as the first embodiment, with the same heat exchangers and offtakes being employed.

In some cases, the airflow and pressure requirements of the pre-burner 222 and hydrogen fuel cell may differ from one another. For example, the hydrogen fuel cell 260 typically requires a relatively low pressure air supply (at around 1 to 4 bar of pressure for example), i.e. lower than the air pressure required for the burner 222. As such, separate compressor air bleeds may be provided for the burner 222 and fuel air cell 260, rather than the single feed shown. Typically, a low-pressure compressor stage (such as an earlier stage of the high-pressure compressor 204, or a stage of the low-pressure compressor 202) would be employed for the hydrogen fuel cell 260, while a higher pressure stage would be utilised for the burner 222.

It will be understood that aspects of these two embodiments could be combined, for example, the turbine 240 and air compressor 250 could be retained, with air from the air compressor 250 being used for aircraft pneumatic systems such as passenger air conditioning systems. Alternatively, the turbine 240 could power a load such as an electrical generator. Similarly, the bleed offtake 382 could be provided in the system of the first embodiment for provision of additional hydrogen fuel cell intake air where insufficient air is provided by the compressor 250.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

For example, the system is suitable for use with other gas turbine engine types.

In one example, the gas turbine engine could be of a "complex cycle" type, comprising one or more recuperator configured to transfer heat from a turbine outlet to a combustor inlet, and an inter-cooler configured to cool compressed air between compressor stages of the core compressor.

In such a complex cycle, specific fuel consumption is typically reduced, and as such, the fuel cell would have to be sized to accommodate the reduced fuel flow.

Similarly, the gas turbine engine could comprise a direct-drive turbofan, which omits the reduction gearbox. Alternatively, the gas turbine engine could comprise a geared or un-geared open rotor or turboprop engine.

The invention claimed is:

1. A combined gas turbine engine and hydrogen fuel cell system comprising:
   a hydrogen fueled gas turbine engine;
   a cryogenic liquid hydrogen fuel tank;
   a first fuel offtake configured and arranged to divert a portion of hydrogen fuel from a main fuel conduit;
   a burner configured and arranged to burn the portion of hydrogen fuel diverted from the first fuel offtake;
   a heat exchanger configured and arranged to transfer heat from exhaust gasses produced by the burner to hydrogen fuel in the main fuel conduit;
   a second fuel offtake arranged to divert a portion of hydrogen fuel from the main fuel conduit downstream of the heat exchanger; and
   a hydrogen fuel cell configured and arranged to produce electric power using hydrogen fuel diverted from the second fuel offtake, wherein:
      the hydrogen fuel cell comprises a cooling system comprising a closed cooling loop,
      the closed cooling loop comprises a first fuel cell heat exchanger configured to transmit waste heat from the hydrogen fuel cell to a coolant of the closed cooling loop, and
      the closed cooling loop comprises a second fuel cell heat exchanger arranged to transmit waste heat from the coolant of the closed cooling loop to hydrogen fuel.

2. The combined gas turbine engine and hydrogen fuel cell system according to claim 1, wherein the second fuel cell heat exchanger is provided upstream of the hydrogen fuel cell and downstream of the second fuel offtake with respect to a flow of the fuel diverted from the second fuel offtake.

3. The combined gas turbine engine and hydrogen fuel cell system according to claim 2, wherein a third fuel offtake is provided downstream of the second fuel cell heat exchanger with respect to the flow of the fuel diverted from the second fuel offtake, and is configured to offtake a portion of the hydrogen fuel diverted from the second fuel offtake to fuel the hydrogen fuel cell and divert a remaining portion of the hydrogen fuel diverted from the second fuel offtake to a bypass line.

4. The combined gas turbine engine and hydrogen fuel cell system according to claim 3, wherein a third fuel cell heat exchanger is provided in the bypass line downstream of the third fuel offtake, and is configured to exchange heat between hydrogen fuel in the bypass line and a fuel cell air intake line.

5. The combined gas turbine engine and hydrogen fuel cell system according to claim 3, wherein the bypass line comprises an outflow which exhausts into the main fuel conduit downstream of the second fuel offtake with respect to a flow of fuel provided by the main fuel conduit to the gas turbine engine.

6. The combined gas turbine engine and hydrogen fuel cell system according to claim 1, further comprising a burner exhaust turbine arranged to be driven by exhaust gasses from the burner.

7. The combined gas turbine engine and hydrogen fuel cell system according to claim 6, wherein the burner exhaust turbine is configured to drive a fuel cell air compressor configured to provide air to the hydrogen fuel cell.

8. The combined gas turbine engine and hydrogen fuel cell system according to claim 1, wherein the hydrogen fueled gas turbine engine comprises a bleed air system configured to bleed compressed air from a gas turbine engine core compressor and supply it to the burner to burn with the portion of hydrogen fuel diverted from the first fuel offtake.

9. The combined gas turbine engine and hydrogen fuel cell system according to claim 8, wherein the bleed air system is configured to supply air to the hydrogen fuel cell.

\* \* \* \* \*